(12) United States Patent
Kenyon et al.

(10) Patent No.: US 11,137,076 B1
(45) Date of Patent: Oct. 5, 2021

(54) SPOOL VALVE PLUG

(71) Applicant: BorgWarner Inc., Auburn Hills, MI (US)

(72) Inventors: Brian T. Kenyon, McGraw, NY (US); Joshua D. Plumeau, Groton, NY (US)

(73) Assignee: BORGWARNER, INC., Auburn Hills, MI (US)

( * ) Notice: Subject to any disclaimer, the term of this patent is extended or adjusted under 35 U.S.C. 154(b) by 0 days.

(21) Appl. No.: 16/879,183

(22) Filed: May 20, 2020

(51) Int. Cl.
  *F16K 3/26* (2006.01)
  *F16K 15/02* (2006.01)
  *F16K 11/07* (2006.01)

(52) U.S. Cl.
  CPC .......... *F16K 3/267* (2013.01); *F16K 11/0716* (2013.01); *F16K 15/028* (2013.01)

(58) Field of Classification Search
  CPC ..... F16K 3/267; F16K 15/028; F16K 11/0716
  See application file for complete search history.

(56) References Cited

U.S. PATENT DOCUMENTS

| | | | |
|---|---|---|---|
| 803,000 A | 10/1905 | Lentz | |
| 2,910,081 A * | 10/1959 | Karbowniczek | F16K 11/0716 137/625.68 |
| 3,049,149 A | 8/1962 | Brueder | |
| 3,433,267 A * | 3/1969 | Stryker | F16K 11/0716 137/625.69 |
| 5,598,871 A | 2/1997 | Sturman et al. | |
| 8,701,711 B2 | 4/2014 | Sharron | |
| 9,803,520 B2 * | 10/2017 | Smith | F01L 1/047 |
| 10,443,455 B2 | 10/2019 | Hamasaki et al. | |

FOREIGN PATENT DOCUMENTS

WO    WO2011130341 A1    10/2011

* cited by examiner

*Primary Examiner* — Jessica Cahill
*Assistant Examiner* — Patrick C Williams
(74) *Attorney, Agent, or Firm* — Reising Ethington P.C.

(57) ABSTRACT

A spool valve assembly, configured to control the flow of fluid, includes a spool valve, configured to move axially along an axis to control fluid flow, having a spool cavity and a plurality of spool apertures that communicate fluid between the spool cavity and an outside surface of the spool valve; a valve sleeve, in which the spool valve is concentrically positioned, that slidably receives the spool valve; and a valve plug, received within the spool cavity, having at least one plug aperture and a plug cavity, wherein the spool apertures at least partially overlap the plug aperture(s) in a radial direction to permit the flow of fluid between the plug cavity and the outside surface within a defined flow rate variance regardless of the angular position of the valve plug relative to the angular position of the spool valve.

8 Claims, 3 Drawing Sheets

SPOOL VALVE PLUG

TECHNICAL FIELD

The present application relates to valves that control fluid flow and, more particularly, to a linearly-actuated fluid valve.

BACKGROUND

Fluid flow can be regulated by fluid valves having valve members that move from a closed position preventing fluid flow through a fluid pathway to an open position that permits fluid flow through the pathway. More particularly, linearly-actuated valves—sometimes referred to as spool valves—can control the fluid flow from a pressurized fluid source to a device, such as a hydraulically-actuated variable camshaft timing (VCT) device. The spool valve can include spool valve openings or apertures through which fluid flows. As the spool valve moves axially along the longitudinal or central axis, the valve closes off or exposes these apertures to fluid flow. One or more plugs can be inserted within a cavity of the spool valve so that the plug is concentric to the spool valve. The plug(s) has/have its own plug openings/apertures through which fluid flows.

Plug(s) have been inserted into the cavity at a defined angular position such that the plug apertures align with the spool valve apertures. Otherwise, the plug apertures and spool valve apertures may be offset from each other and significantly reduce flow. However, during manufacturing, the angular alignment of plug with spool valve can increase manufacturing complexity.

SUMMARY

In one implementation, a spool valve assembly, configured to control the flow of fluid, includes a spool valve, configured to move axially along an axis to control fluid flow, having a spool cavity and a plurality of spool apertures that communicate fluid between the spool cavity and an outside surface of the spool valve; a valve sleeve, in which the spool valve is concentrically positioned, that slidably receives the spool valve; and a valve plug, received within the spool cavity, having at least one plug aperture and a plug cavity, wherein the spool apertures at least partially overlap the plug aperture(s) in a radial direction to permit the flow of fluid between the plug cavity and the outside surface within a defined flow rate variance regardless of the angular position of the valve plug relative to the angular position of the spool valve.

DETAILED DESCRIPTION

A linearly-actuated (spool) fluid valve can control the flow of fluid from a pressurized fluid source to a destination, such as a hydraulically-actuated variable camshaft timing (VCT) device. A valve sleeve can receive the spool valve within a hollow interior such that the linear movement of the spool valve relative to the valve sleeve can open and close sleeve apertures to fluid flow depending on the linear position of the spool valve relative to the valve sleeve. The spool valve can include a plurality of lands that extend radially-outwardly away from the longitudinal axis of the valve. In between the lands, the spool valve has openings or apertures through which fluid flows. As the spool valve moves axially or linearly along the longitudinal or central axis, the lands close off and expose these spool valve apertures to fluid flow. Concentric to the spool valve and radially-inwardly positioned to the lands are one or more plugs that are inserted within a cavity of the spool valve. The plug(s) have plug openings/apertures through which fluid flows.

In the past, the plug(s) have been inserted into the cavity at a defined angular position such that the plug apertures align with the spool apertures. Otherwise, the plug apertures and spool valve apertures may be offset from each other and reduce flow. However, it is possible to select a quantity of plug apertures relative to a quantity of spool apertures such that regardless of the angular position of the plug relative to the spool valve the fluid flow does not vary more than a defined amount. In one implementation, the flow variation at different relative angular positions between the spool valve and the plug is no more than 0.66 mm$^2$. That is, the exposed area of the spool apertures relative to the exposed area of the plug apertures does not vary more than a small amount regardless of the angular relationship of these two elements.

Figure 1:
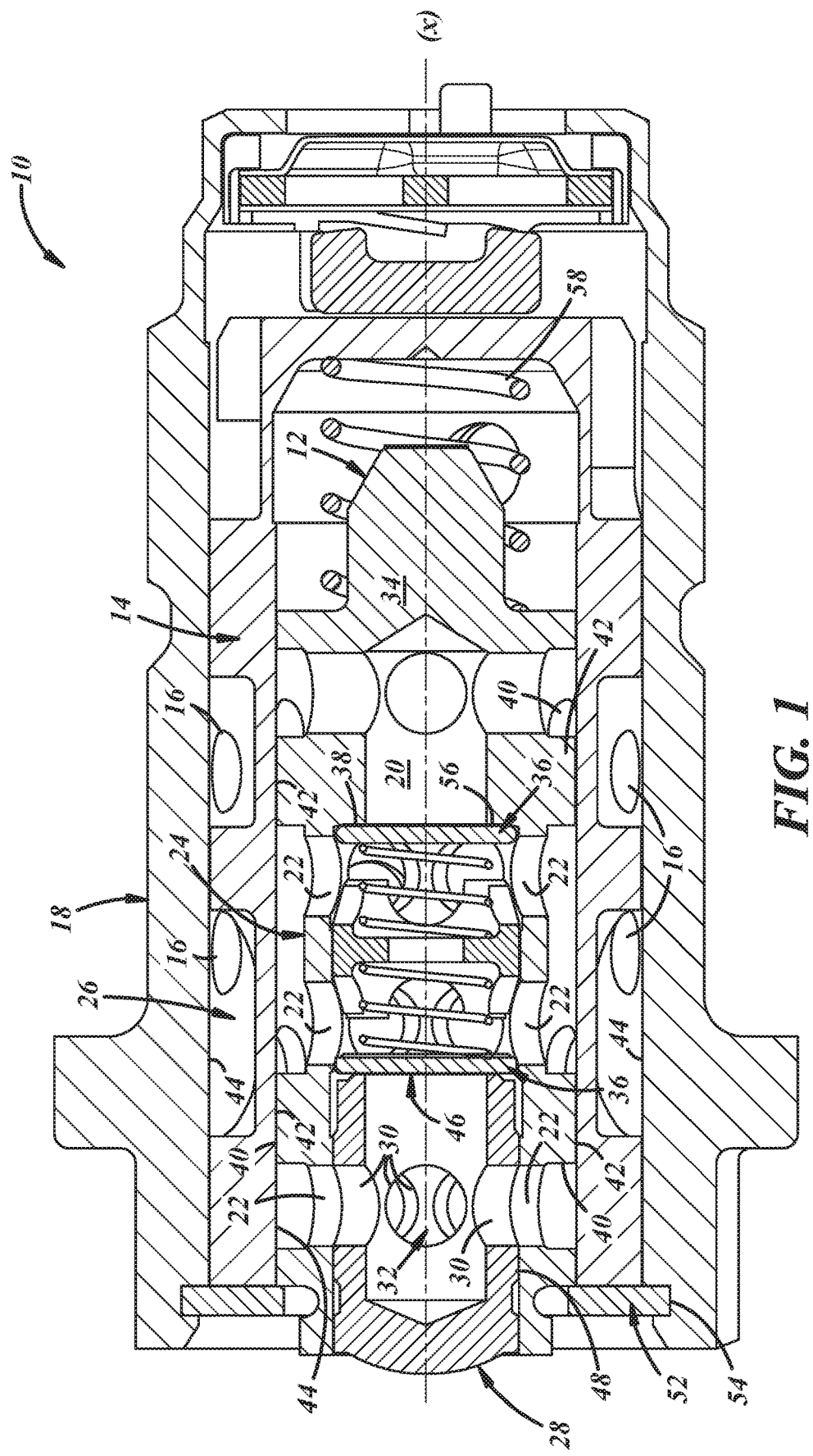
FIG. 1 is a view depicting a cross-sectional view of an implementation of a spool valve assembly.
Figure 2:
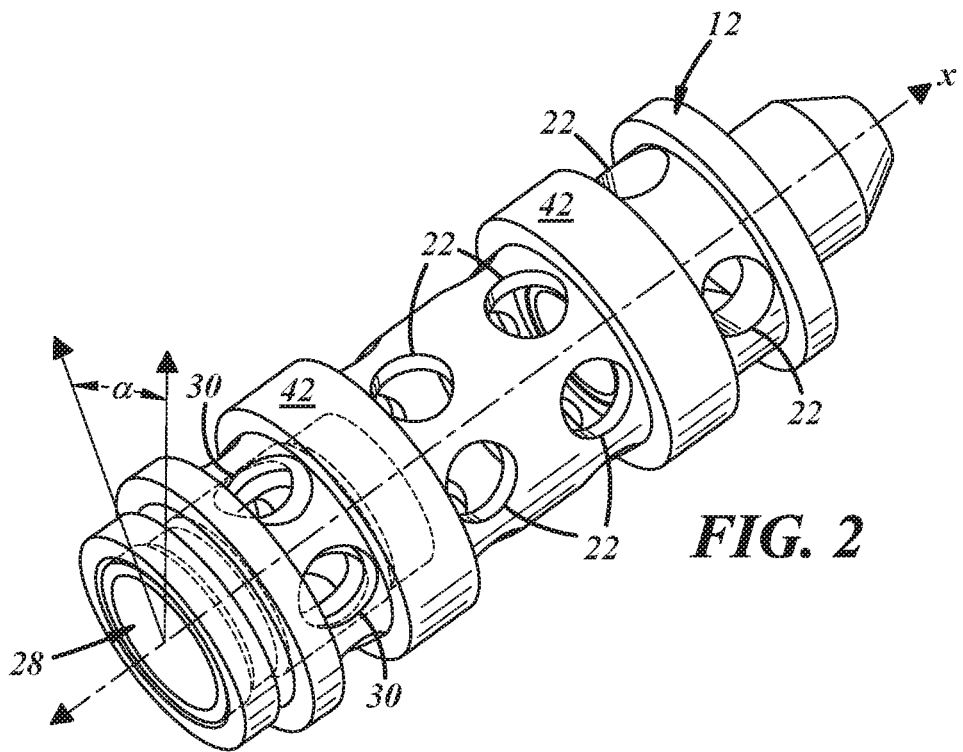
FIG. 2 is a perspective view depicting an implementation of a spool valve and a valve plug.
Figure 3:
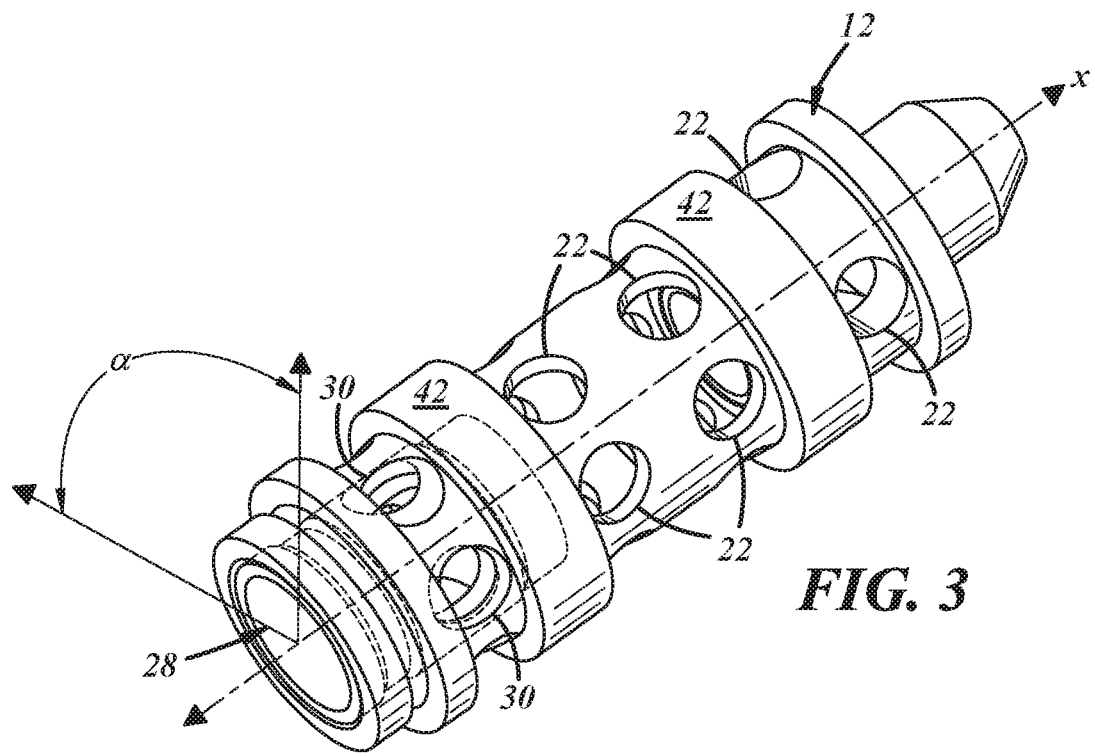
FIG. 3 is another perspective view depicting an implementation of a spool valve and a valve plug.
Figure 4:
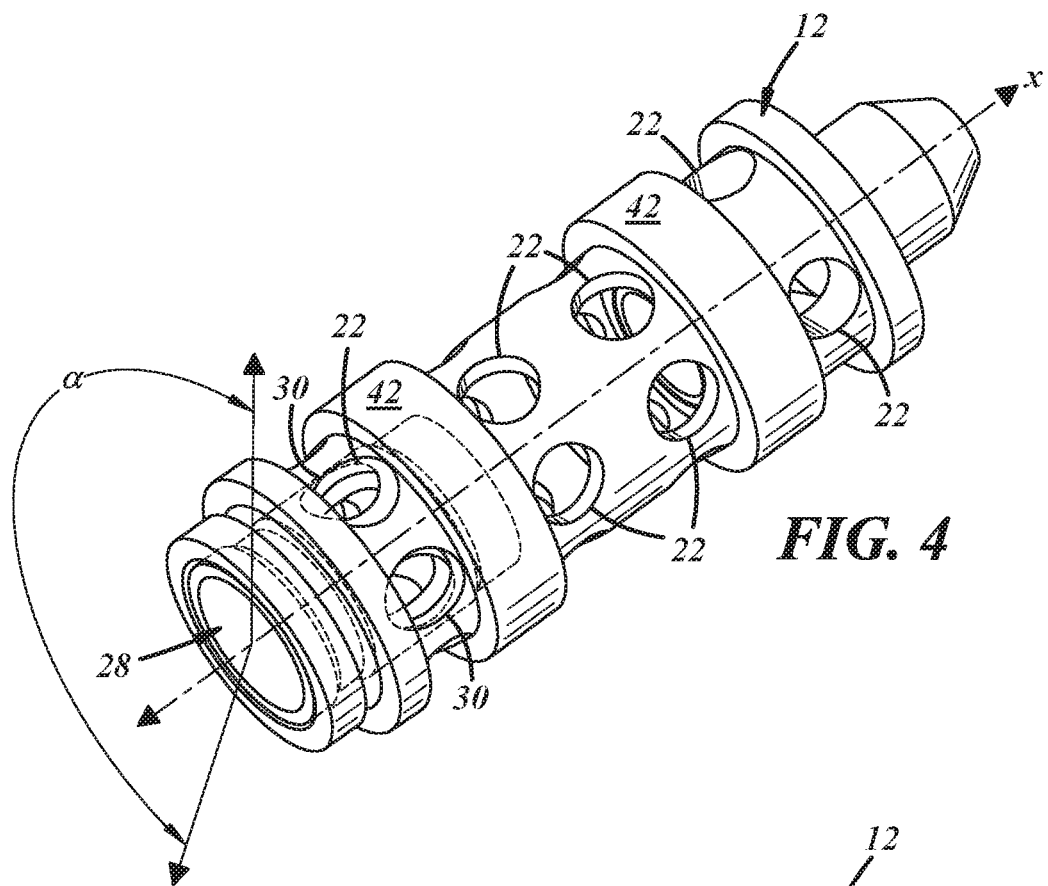
FIG. 4 is another perspective view depicting an implementation of a spool valve and a valve plug.
Figure 5:
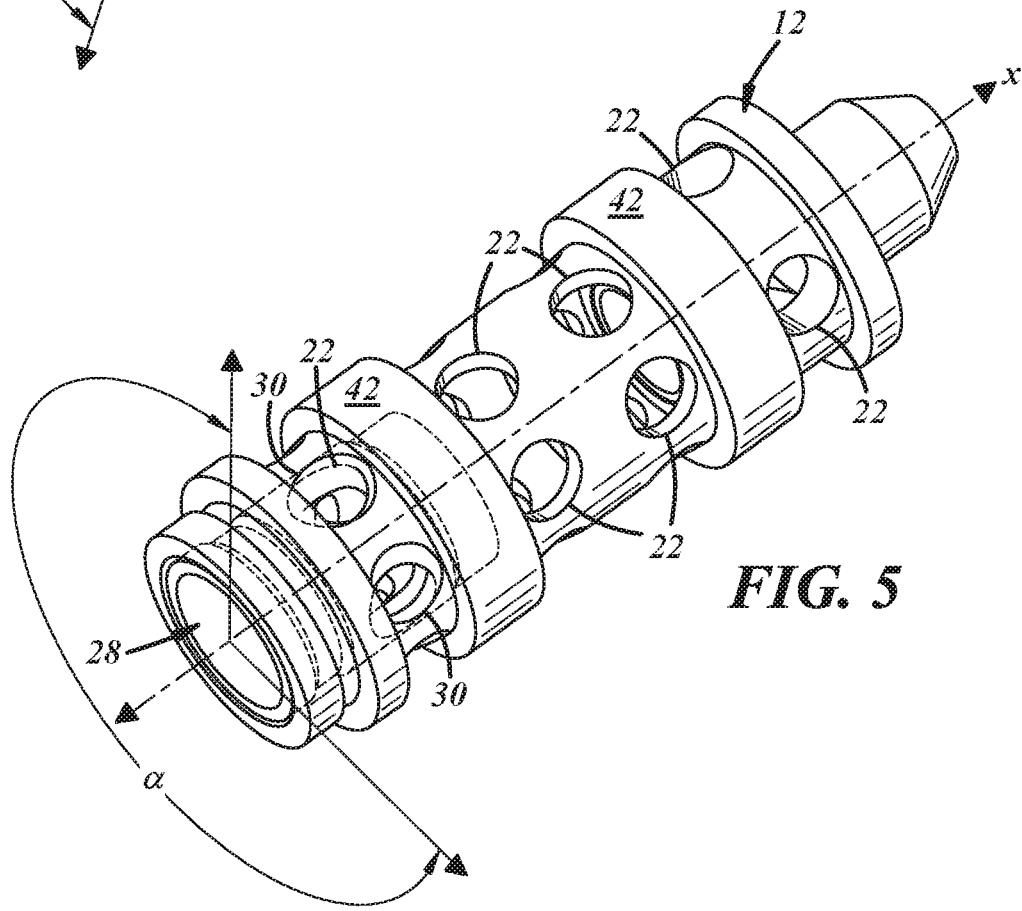
FIG. 5 is another perspective view depicting an implementation of a spool valve and a valve plug.

Turning to FIG. 1, a spool valve assembly 10 is shown that includes a spool valve 12 that moves linearly along an axis (x) to control the flow of fluid. The spool valve assembly 10 can include a valve sleeve 14, having sleeve apertures 16, that receives the spool valve 12. The assembly 10 can also include a center bolt 18 within which the valve sleeve 14 is concentrically positioned. The spool valve 12 and the valve sleeve 14 can be received by the center bolt 18 and used with a hydraulically-actuated variable camshaft timing (VCT) device (not shown). Or the assembly 10 can be used in other applications, such as oil control valves. The spool valve 12 includes a spool cavity 20 and a plurality of spool apertures 22 that communicate fluid between the spool cavity 20 and an outside surface 24 of the spool valve 12 where the fluid can then pass through the sleeve apertures 16 to an outside surface 26 of the valve sleeve 14 where the fluid is ultimately directed to its intended destination. The assembly 10 also includes a valve plug 28, received within the spool cavity 20, having at least one plug aperture 30 and a plug cavity 32. The spool apertures 22 at least partially overlap the plug aperture(s) 30 extending outward from the axis (x) in a radially-outward direction to permit the flow of fluid between the plug cavity 32 and the outside surface 24 of the spool valve 12.

The spool valve 12 can be implemented as a valve body 34 having an elongated structure that is hollow, forming the spool cavity 20 within the valve body 34. The valve body 34 can include the plurality of spool apertures 22 that extend from the spool cavity 20 to the outside surface 24 of the spool valve 12 to permit fluid to move radially outwardly from the cavity 20 toward the outer surface 24. One or more check valves 36 can be positioned within the spool cavity 20 along the axis (x) and concentric to the valve body 34. The check valves 36 can include valve elements in the form of ball checks or disk checks, for example. The spool cavity 20 can include an axial stop 38 that extends radially-inwardly toward the axis (x) that prevents the axial movement of a check valve 36 and may serve as a valve seat. One or more lands 40 can be positioned axially along the outer surface 24 adjacent to the spool apertures 22. The lands 40 can extend radially-outwardly from the outer surface 24 of the valve body 34 and have a land surface 42 that closely conforms to an inner surface 44 of the valve sleeve 14. As the spool valve 12 moves along the axis (x), the lands 40 slide along the inner surface 44 to selectively block or expose the spool apertures 22 to the flow of fluid. The land surface 42 can fit with the inner surface 44 of the valve sleeve 14 such that the land(s) 40 prevent the flow of fluid from one side of the land 40 to another side of the land 40. The spool valve 12 can be made from a metal alloy, such as steel or aluminum, or other similar resilient material. A spring 58 can bias the spool valve 12 into one axial position and a solenoid or other similar linearly-moving mechanism can slide the spool valve 12 relative to the valve sleeve 14.

The valve plug 28 can be received by the spool valve 12 within the spool cavity 20. The valve plug 28 can be formed from a hollow structure that includes the plug cavity 32 in a central portion of the valve plug 28. The plug cavity 32 can be open at one end 46 and the axis (x) can pass through the plug cavity 32. The valve plug 28 can be positioned within the spool cavity 20 without regard to the angular position of the valve plug 28 relative to the spool valve 28 as measured by the angular displacement or rotational position of each other relative to the axis (x). An outer surface 48 of the valve plug 28 can closely conform to a surface 50 of the spool cavity 20. The valve plug 28, along with other elements of the spool valve assembly 10, can be prevented from moving axially relative to each other and the center bolt 18 by a spring clip 52 received within an annular groove 54 included in the center bolt 18. The spring clip 52 expand radially outwardly into the groove 54 and help maintain the axial position of the valve plug 28 relative to the spool valve 12 so that spool apertures 22 can align with the plug apertures 30 along the axis (x). In other implementations, the valve plug 28 can be press fit into the spool cavity 20 to prevent the angular displacement of the valve plug 28 relative to the spool valve 12 as well as axial movement along axis (x). The valve plug 28 can include one or more plug apertures 30 that extend from the plug cavity 32 to the outer surface 48 of the valve plug 28. The plug apertures 30 can facilitate the flow of fluid from the plug cavity 32 through the spool apertures 22 to the outside surface 24 of the spool valve 12. An end of the valve plug 28 can support the check valve 36 and a support 56 within the spool cavity 20 can support another check valve 36.

Regardless of the relative angular position (a) of the valve plug 28 with respect to the spool valve 12, the rate of flow between the plug cavity 32 and the outside surface 24 falls within a defined flow rate variance. FIGS. 2-5 depict the spool valve 12 with respect to the valve plug 28 at different angular positions (a) relative to each other. The defined flow rate variance can be calculated by measuring or determining a minimum flow rate and a maximum flow rate through the spool apertures 22 and the plug apertures 30. The minimum flow rate can exist when an overlap of spool apertures 22 relative to plug apertures 30 as the spool valve 12 is angularly positioned relative to the valve plug 28 creates a minimum rate of fluid flow from the spool cavity 20 to the outside surface 24 of the spool valve 12 through the spool valve 12 and the valve plug 28. The maximum flow rate can exist when an overlap of spool apertures 22 relative to plug apertures 30 as the spool valve 12 is angularly positioned relative to the valve plug 28 creates a maximum rate of fluid flow from the spool cavity 20 to the outside surface 24 of the spool valve 12 through spool valve 12 and the valve plug 28. The defined flow rate variance can be determined by subtracting the minimum flow rate from the maximum flow rate. Minimization of the defined flow rate variance can be achieved by having a different quantity of spool apertures 22 than the quantity of plug apertures 30. In one implementation, the quantity of spool apertures 22 is greater than the quantity of plug apertures 30. For example, the spool valve 12 can include seven apertures 22 whereas the valve plug 28 can include six apertures 30. The increased quantity of spool apertures 22 relative to plug apertures 30 can help ensure that the possible range or variation of cross-sectional area of spool apertures 22 to plug apertures 30 is minimized thus maintaining as much flow area as possible regardless of orientation of the valve plug 28 relative to the spool valve 12.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A spool valve assembly configured to control the flow of fluid, comprising:
   a spool valve, configured to move axially along an axis to control fluid flow, having a spool cavity and a plurality of spool apertures that communicate fluid between the spool cavity and an outside surface of the spool valve;
   a valve sleeve, in which the spool valve is concentrically positioned, that slidably receives the spool valve; and
   a valve plug, received within the spool cavity and angularly displaceable relative to the spool valve during assembly, having at least one plug aperture and a plug cavity, wherein the spool apertures at least partially overlap the plug aperture(s) in a radial direction such that the exposed area of the spool apertures relative to the exposed area of the plug apertures permits the flow of fluid between the plug cavity and the outside surface within a defined flow rate variance regardless of the angular position of the valve plug relative to the angular position of the spool valve.

2. The spool valve assembly recited in claim 1, wherein the quantity of spool apertures is different than the quantity of plug apertures.

3. The spool valve assembly recited in claim 2, wherein the quantity of spool apertures is greater than the quantity of plug apertures.

4. The spool valve assembly recited in claim 1, further comprising a center bolt that receives the valve sleeve.

5. The spool valve assembly recited in claim 4, wherein the valve sleeve and the valve plug are axially constrained with respect to the center bolt with a spring clip.

6. The spool valve assembly recited in claim 1, wherein the valve plug is press fit into the spool cavity.

7. The spool valve assembly recited in claim 1, further comprising one or more check valves positioned in the spool cavity.

8. The spool valve assembly recited in claim 1, wherein the flow rate variance at different angular positions between the spool valve and the valve plug is not more than 0.66 mm$^2$.

\* \* \* \* \*